United States Patent
Slayter et al.

(10) Patent No.: US 11,859,693 B2
(45) Date of Patent: Jan. 2, 2024

(54) GEAR TIMING WITH HELICAL SPLINE AND SHIMS

(71) Applicant: Hamilton Sundstrand Corporation, Charlotte, NC (US)

(72) Inventors: Matthew Allen Slayter, Rockford, IL (US); Paul F. Fox, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 43 days.

(21) Appl. No.: 16/811,872

(22) Filed: Mar. 6, 2020

(65) Prior Publication Data

US 2021/0277978 A1 Sep. 9, 2021

(51) Int. Cl.
  *F16H 1/08* (2006.01)
  *F16H 1/10* (2006.01)
  *F16H 57/00* (2012.01)
  *F16H 55/17* (2006.01)

(52) U.S. Cl.
  CPC ............. *F16H 1/08* (2013.01); *F16H 1/10* (2013.01); *F16H 57/0025* (2013.01); *F16H 55/17* (2013.01)

(58) Field of Classification Search
  CPC ............ F16H 57/0018; F16H 57/0025; F16H 57/0031; F16H 57/0037; F16H 55/18; F16H 1/08; F16H 1/10; F16H 55/17
  See application file for complete search history.

(56) References Cited

U.S. PATENT DOCUMENTS

| | | | | |
|---|---|---|---|---|
| 3,586,144 | A | * | 6/1971 | Rogers ................... F16H 37/00 475/158 |
| 4,017,979 | A | * | 4/1977 | Lenz ...................... G01B 5/146 33/517 |
| 4,778,303 | A | * | 10/1988 | Mullins .................. F16D 1/108 403/11 |
| 5,000,640 | A | * | 3/1991 | Haas, Jr. ............. F16B 23/0061 411/409 |

(Continued)

FOREIGN PATENT DOCUMENTS

| CN | 202659872 U | 1/2013 |
|---|---|---|
| DE | 102012007293 A1 | 10/2012 |

(Continued)

OTHER PUBLICATIONS

"Differential Case Installation With Universal Shims", Youtube Video, Jul. 2, 2018, https://www.youtube.com/watch?v=yE-2IVqAwOw (Year: 2018).*

(Continued)

*Primary Examiner* — Gregory Robert Weber
(74) *Attorney, Agent, or Firm* — Locke Lord LLP; Joshua L. Jones; Gabrielle L. Gelozin

(57) ABSTRACT

A gear assembly includes a first gear wheel including a first gear wherein a plurality of teeth of the first gear are oriented in a first direction and a second gear wherein a plurality of teeth of the second gear are oriented not-parallel to the primary axis. A second gear wheel is configured to match the second gear of the first gear wheel including an outer gear and an inner gear wherein a plurality of teeth of the inner gear are oriented parallel to the plurality of teeth of second gear. A retention member can be used to secure the second gear wheel on the first gear wheel.

14 Claims, 2 Drawing Sheets

(56) References Cited

U.S. PATENT DOCUMENTS

| | | | | |
|---|---|---|---|---|
| 5,069,654 | A * | 12/1991 | Rampe | F16H 57/0025 |
| | | | | 474/161 |
| 8,720,113 | B1 * | 5/2014 | Krivoy | E05F 15/63 |
| | | | | 49/339 |
| 2006/0120798 | A1 * | 6/2006 | Guarino | F16H 57/0025 |
| | | | | 403/359.5 |
| 2007/0111841 | A1 | 5/2007 | Smith | |
| 2012/0282020 | A1 * | 11/2012 | Hebrard | F16D 1/116 |
| | | | | 403/316 |
| 2013/0199323 | A1 * | 8/2013 | Fong | F16H 55/18 |
| | | | | 74/409 |
| 2018/0187759 | A1 * | 7/2018 | Smith | H02P 29/032 |
| 2020/0370634 | A1 * | 11/2020 | Barrientos Blanco | F16D 11/14 |

FOREIGN PATENT DOCUMENTS

| | | | | | |
|---|---|---|---|---|---|
| DE | 102018115172 | A1 * | 1/2020 | | B60K 1/00 |
| JP | 63072915 | A | | 4/1988 | |
| JP | 2031060 | A | | 2/1990 | |
| JP | 2009138916 | A | * | 6/2009 | |
| JP | 2015068498 | A | * | 4/2015 | |
| JP | 2017032127 | A | * | 2/2017 | |
| JP | 6424770 | B2 | | 11/2018 | |

OTHER PUBLICATIONS

Extended European search report issued in corresponding EP application No. 21159292.8, dated Jul. 15, 2021.

* cited by examiner

GEAR TIMING WITH HELICAL SPLINE AND SHIMS

TECHNOLOGICAL FIELD

The present disclosure relates to a cluster gear, and more particularly to a cluster gear assembly including a cluster gear kit adaptable for multiple configurations.

DESCRIPTION OF RELATED ART

A variety of gear arrangements are known, such as planetary and cluster gears. However, arranging multiple cluster or planetary gears together requires precise timing, which can be very costly and time consuming. Aligning teeth of gears of different diameters is a very time consuming task for any assembly shop. Also, this process typically requires welding, followed by a post-grind operation, and grouping of similarly timed gears. Accordingly, there is a need in the art for a gear arrangement having improved adaptability. There also is a need in the art for such gear assemblies and components to be economically viable. The present disclosure addresses these needs.

SUMMARY OF THE INVENTION

A gear set includes a first gear wheel comprising a shaft bore defining a primary axis, including a first gear wherein teeth of the first gear are oriented parallel to the primary axis and a second gear wherein teeth of the second gear are oriented not-parallel to the primary axis, a second gear wheel configured to match the second gear of the first gear wheel including an outer gear wherein teeth of the outer gear are oriented parallel to the primary axis and an inner gear wherein teeth of the inner gear are oriented parallel to the second gear teeth, at least one shim configured to appropriately locate the second gear wheel on the first gear wheel, and a retention member, such as the retention member is a retaining ring, a locknut, or a pressed on bearing, configured to secure the second gear and the at least one shim on the first gear wheel.

The second gear of the first gear wheel and the inner gear of the second gear wheel can include helical splines. The first gear can have a larger primary diameter than the second gear and the first gear of the first gear wheel can include a larger primary diameter than the outer gear of the second gear wheel.

The second gear of the first gear wheel can be wider along the primary axis than the second gear wheel. The at least one shim can include multiple shims, and include shims of different thicknesses. The first gear wheel can include a flange configured to separate the shim from the second gear and second flange configured to define a maximum position of the second gear wheel along the second gear of the first gear wheel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
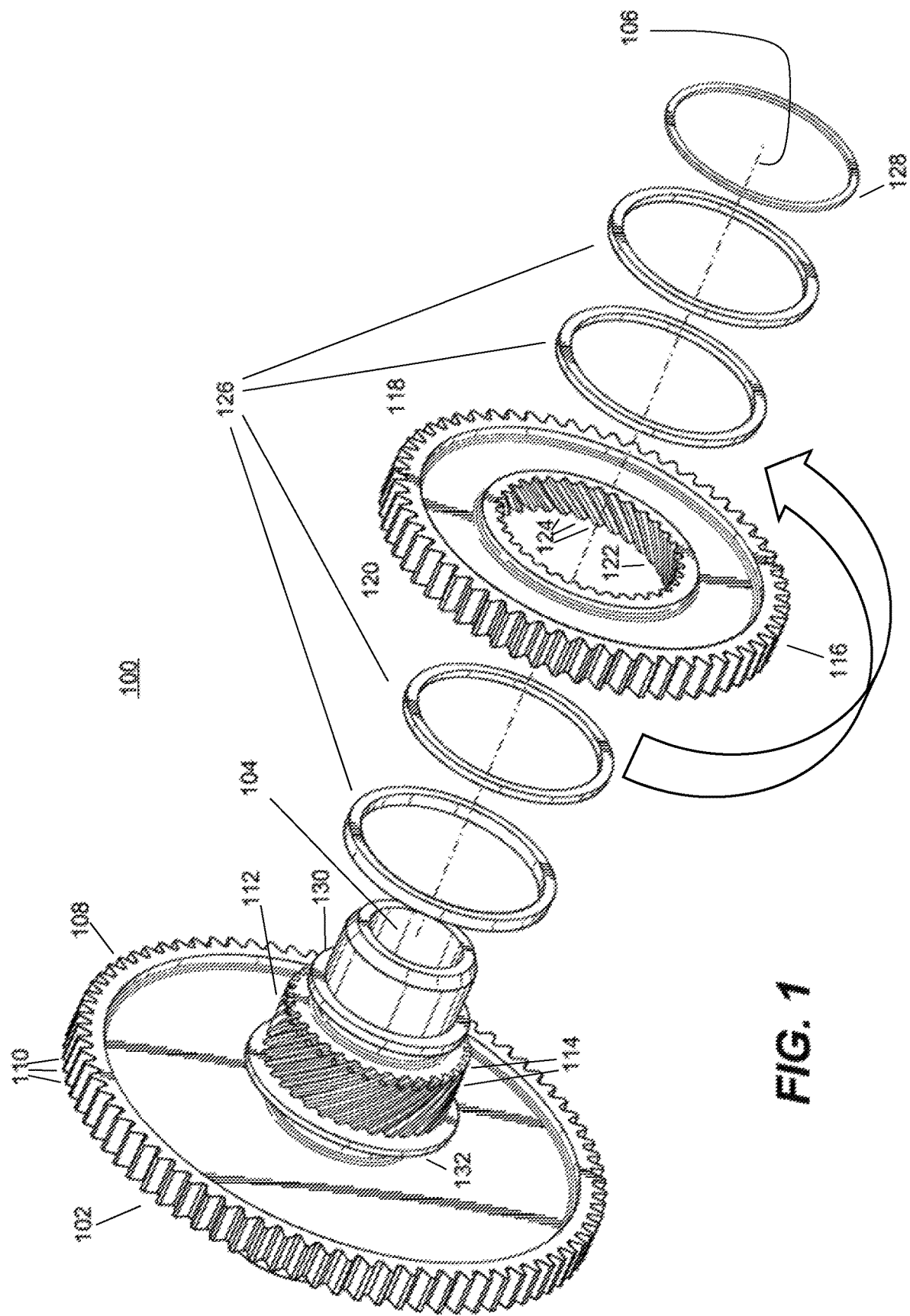
FIG. 1 is an exploded view of a gear assembly according to an embodiment of the disclosure.

Reference will now be made to the drawings wherein like reference numerals identify similar structural features or aspects of the subject invention. For purposes of explanation and illustration, and not limitation, a partial view of an exemplary embodiment of a gear assembly in accordance with the disclosure is shown in FIG. 1 and is designated generally by reference character 100. Other embodiments of the gear assembly in accordance with the invention, or aspects thereof, are provided in FIG. 2 as will be described. The methods and systems of the invention can be used to simplify gear retention and precision between different systems.

FIG. 1 shows a gear assembly 100 including a first gear wheel 102, which includes a shaft bore 104 which defines a primary axis 106. The first gear wheel 102 further includes a first gear 108 wherein teeth 110 of the first gear 108 are oriented parallel to the primary axis 106 and a second gear 112 wherein teeth 114 of the second gear 112 are oriented not-parallel to the primary axis 106. The gear assembly 100 also includes a second gear wheel 116 meant to mate the second gear 112 of the first gear wheel 102. The second gear wheel 116 includes an outer gear 118 wherein teeth 120 of the outer gear 118 are oriented parallel to the primary axis 106 and an inner gear 122 wherein teeth 124 of the inner gear 122 are oriented parallel to teeth 114 of the second gear 112 of the first gear wheel 102. The second gear 112 of the first gear wheel 102 and the inner gear 122 of the second gear wheel 116 mate and can form, for example, helical splines.

FIG. 1 further shows a set of shims 126 configured to appropriately locate the second gear wheel 116 along the shaft bore 104 and a retention member 128, such as a retaining ring, a locknut, or a pressed on bearing, to secure the second gear wheel 116 and the set of shims 126. The second gear wheel 116 has to be positioned on the first gear wheel 102 such that the second gear wheel lines up appropriately with other outer systems (not shown) and such that the teeth 110 of the first gear are aligned with the teeth 120 of the second gear wheel 116. This alignment is important for timing and torque transfer purposes of the assembly 100. When the assembly 100 is pressed together, when the first gear wheel 102 is held in place, and the second gear wheel 116 slides along the teeth 114 of the second gear 112, the second gear wheel 116 will rotate, allowing a user to locate and align the teeth 114 of the second gear and the teeth 120 of the outer gear 118 of the second gear wheel 116. Once the appropriate location of the second gear wheel 116 along the second gear 112 is identified, the second gear wheel can be secured with the shim 126. The ability to rotate the second gear wheel 116 circumferentially by changing its axial position along the spline of the second gear 112 saves machinists and assembly personnel a lot of time when assembling cluster gears.

The shims of the shim pack 126 can be arranged as required in order to secure the second gear wheel 116. For instance in FIG. 1, two shims of differing thicknesses are placed on each side of the second gear wheel 116. The shims of the shim pack 126 can consist of varying thicknesses, it is also considered that shim packs 126 can include shims of the same thickness. For example in a non-limiting configuration, in order to move the second gear wheel 116 closer to the first gear wheel 108 by 0.004 inches, a user would remove one 0.054 shim from one side of the second gear wheel 116 and swap it with a 0.050 shim from the second side of the second gear wheel. This allows an angular rotation between the gear teeth 110 and the gear teeth 120 to adjust timing following the angle of the helical spline.

Further shown in FIG. 1, a flange 130 on the first gear wheel 102 in order to help secure the retaining member 128. The first gear wheel can include a second flange 132 configured to define a maximum position of the second gear wheel 116 along the second gear 112 of the first gear wheel 102.

Figure 2:
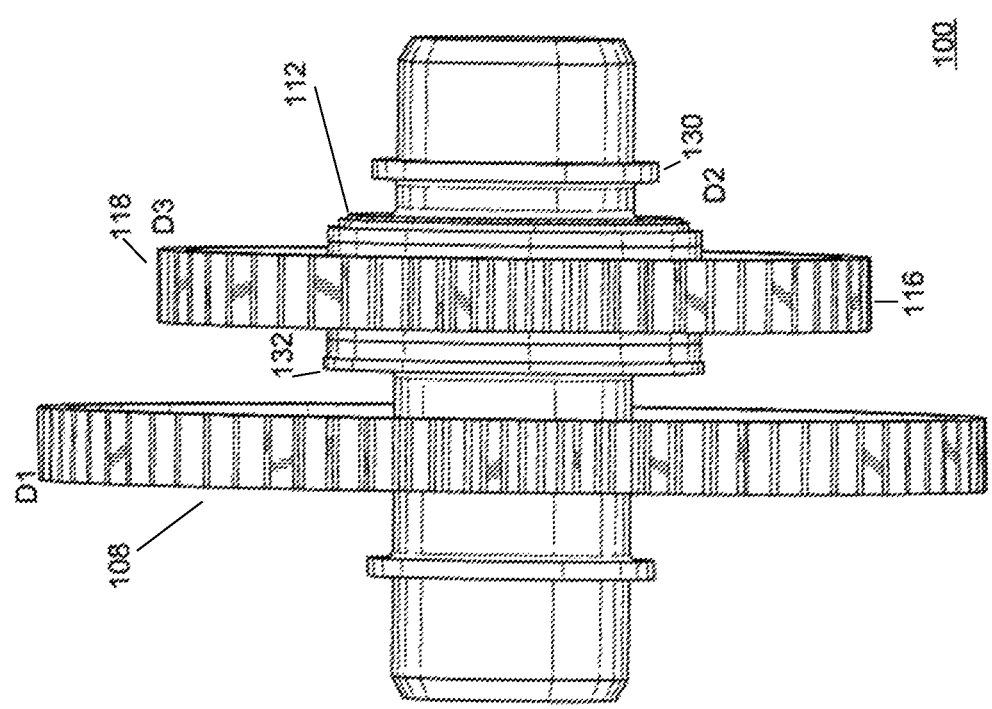
FIG. 2 is a side view of the assembly of FIG. 1 showing the shims of the shim stack arranged along the second gear.

FIG. 2 shows the gear assembly 100 in an assembled manner. The first gear 108 is shown having a larger primary diameter (D1) than the outer diameter (D2) of the second gear 112, also first gear 108 of the first gear wheel 102 includes a larger primary diameter (D1) than the diameter (D3) outer gear 118 of the second gear wheel 116. Although alternate embodiments wherein D3 is larger than D1 and D2 is larger than D1 are also possible. The second gear 112 of the first gear wheel 102 is wider along the primary axis 106 than the second gear wheel 116. This feature further allows the second gear wheel 116 to be positioned in multiple locations along the second gear 112 of the first gear wheel 102, and be adaptable to multiple configurations and applications.

Further, arrangement of the splined gears provides an axial thrust load. When torque is applied from either the first gear wheel 102 or from the second gear wheel 116 that gear pushes axially into the shoulder of the other gear. If the torque is reversed the force goes into the retention member 128. Reversing the orientation of the spline of the gears allows the loads to be reversed as well. For example, as long as the torque is always the same way for an application a user is able to select which component takes the thrust load, a gear or retaining member, locking in the timing consistently for each load application.

The gear assembly 100 allows for a simple method of assembly without needing to welding and grinding. The assembly process allows for simply threading the second gear wheel 116 onto the first gear wheel 102, measuring the timing of the system without the shims 126, and if necessary removing the second gear wheel 116 and adding the appropriate number or thicknesses of shims 126 to appropriately position the second gear wheel 116 along axis 106, and installing remaining shims on the opposite side of the second gear wheel 116 to minimize the space between retention member 128 and the second gear wheel 116.

The methods and systems of the present disclosure, as described above and shown in the drawings, provide for a gear assembly with superior properties including increased reliability and stability, and complexity, and/or cost. While the apparatus and methods of the subject disclosure have been shown and described with reference to certain exemplary embodiments, those skilled in the art will readily appreciate that changes and/or modifications may be made thereto without departing from the spirit and score of the subject disclosure.

What is claimed is:

1. A gear assembly comprising:
a first gear wheel comprising a shaft bore defining a primary axis, including a first gear wherein a plurality of teeth of the first gear are oriented in a first direction and a second gear wherein a plurality of teeth of the second gear are oriented at an angle relative to the primary axis between parallel and perpendicular;
a second gear wheel configured to match the second gear of the first gear wheel including an outer gear and an inner gear wherein a plurality of teeth of the inner gear are oriented parallel to the plurality of teeth of second gear;
a retention member configured to secure the second gear wheel on the first gear wheel; and
a plurality of shims configured to space the second gear wheel from the first gear wheel and the second gear wheel from the retention member, wherein at least one first shim of the plurality of shims disposed between the first gear wheel and the second gear wheel is configured to rotationally limit the second gear wheel in a first direction and wherein at least one second shim of the plurality of shims disposed between the second gear wheel and the retention member, wherein the at least one first shim is configured to rotationally position the second gear wheel by fixing its axial position along inner gear of the first gear wheel to adjust a timing relationship of the second gear wheel relative to the first gear wheel, wherein the second gear of the first gear wheel and the inner gear of the second gear wheel are helical splines pitched to position the second gear wheel on the first gear wheel with less than one full rotation of the second gear wheel relative to the first gear wheel along the helical splines, wherein the first gear wheel includes a flange separating the at least one first shim from the first gear of the first gear wheel.

2. The gear assembly of claim 1, further comprising shims of different thicknesses.

3. The gear assembly of claim 1, further comprising shims of equal thicknesses.

4. The gear assembly of claim 1, wherein each of the shims of the plurality of shims are interchangeable with one another.

5. The gear assembly of claim 1, wherein the first gear includes a larger primary diameter than the second gear.

6. The gear assembly of claim 1, wherein the first gear of the first gear wheel includes a larger primary diameter than the outer gear of the second gear wheel.

7. The gear assembly of claim 1, wherein the retention member is a retaining ring, a locknut, or a pressed on bearing.

8. The gear assembly of claim 1, wherein the second gear of the first gear wheel is wider along the primary axis than the second gear wheel.

9. The gear assembly of claim 1, wherein the first gear wheel includes a flange configured to define a maximum displacement position of the second gear wheel along the second gear of the first gear wheel.

10. The gear assembly of claim 1, wherein an orientation of at least one of the plurality of teeth of the first gear of the first gear wheel is aligned with an orientation of at least one of the plurality of teeth of the outer gear of the second gear wheel.

11. The gear assembly of claim 1, wherein an orientation of the plurality of teeth of the first gear of the first gear wheel are aligned with an orientation of the plurality of teeth of the outer gear of the second wheel.

12. The gear assembly of claim 11, wherein the plurality of teeth of the first gear of the first gear wheel are parallel with the plurality of teeth of the outer gear of the second wheel.

13. The gear assembly of claim 1, wherein the plurality of teeth of the first gear of the first gear wheel are parallel to the primary axis.

14. A method for assembling the gear assembly of claim 1, comprising:
- placing a second gear wheel onto a first gear of a first gear wheel;
- measuring a timing of the second gear wheel relative to the first gear wheel; and
- installing at least one shim on one or more sides of the second gear wheel to move the second gear wheel axially along the first gear of the first gear wheel to adjust timing of the second gear wheel relative to the first gear wheel.

\* \* \* \* \*